Patented Dec. 4, 1945

2,390,090

UNITED STATES PATENT OFFICE 2,390,090

SUBSTITUTED 1,3,5-TRIAZINYL-(6)-AMINO-PHENYL-ARSENIC COMPOUNDS

Ernst A. H. Friedheim, New York, N. Y.

No Drawing. Application June 3, 1944,
Serial No. 538,695

9 Claims. (Cl. 260—242)

This invention relates to derivatives of triazines containing arsenic, and more particularly to triazine derivatives which contain trivalent arsenic.

In my U. S. Patent No. 2,295,574, issued on September 15, 1942, I have shown that condensation of suitable derivatives of symmetric triazine with phenyl-arsonic acid derivatives results in a new type of condensation products possessing valuable therapeutic properties in diseases caused by spirochaetes or trypanosomes, such as syphilis, and African sleeping sickness.

I have found that new triazine derivatives containing arsenic can be obtained by condensing derivatives of 1,3,5-triazine of the formula

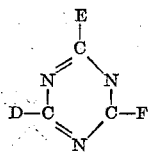

with an aromatic organic compound containing trivalent arsenic and corresponding to the formula W—C$_6$H$_2$(A,B)—As=X.

In these formulas, W is an amino-group or halogen. If W is an amino-group, at least one of the groups D, E, F, is a halogen-group. If W is a halogen, at least one of the groups D, E, F is an amino-group. In both cases the other groups are selected from the group consisting of halogen, NH$_2$, NH Alk., N Alk.$_2$, hydroxy-alkyl-amino, NCH$_2$CHOHCH$_2$OH, dialkyl-amino-alkyl-amino, and aminoacyl radicals, such as

NHCOCH$_3$ and NHCOC$_6$H$_5$; the racials A and B are selected from the group consisting of hydrogen, halogen, OH, O Alk., O acyl, NO$_2$, NH$_2$, NH Alk., N Alk.$_2$, aminoacyl, and alkyl radicals; X is a divalent group selected from the group consisting of O, S, dihalides, such as Cl$_2$, I$_2$ or Br$_2$, and sulfur-containing radicals of the type =(S—R)$_2$ wherein R is an organic radical which is capable of carrying an SH-radical. Such sulfur-containing reactants are, for example, thioglycollic acid, cysteine, or glutathione, thiophenol. As examples of the trivalent arsenic compounds to be used according to my invention, the following may be mentioned: 4-amino-phenylarsinoxide, 4 - chlor-phenylarsinoxide, 4 - amino phenyl-arsindichloride, 4 - amino-phenyl-arsinsulfide, 3-amino-4-oxy-phenylarsinoxide.

The condensation products thus formed have the formula

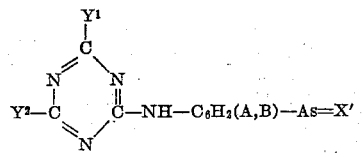

wherein Y$^1$ and Y$^2$ are each a radical selected from the group consisting of halogen, NH$_2$, NH Alk., N Alk.$_2$, hydroxy-alkyl-amino,

NHCH$_2$CHOHCH$_2$OH dialkyl-amino-alkyl-amino, and aminoacyl radicals; A and B are selected from the group consisting of hydrogen, halogen, OH, O Alk., O acyl, NO$_2$, NH$_2$, NH Alk., N Alk.$_2$, amino-acyl, and alkyl radicals, and X' is a divalent radical selected from the group consisting of O, S, dihalides, sulfur-containing groups of the type =(S—R)$_2$, wherein R is an organic radical which is capable of carrying an SH-radical, and groups having the formula

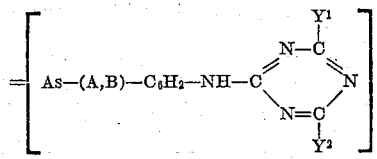

In carrying out the present invention, for example an aqueous solution containing one mol of 4-oxy-3-amino-phenyl-arsinoxide may be caused to react with a fine suspension of 1 mol of 2,4,6-trichloro-1,3,5-triazine in water at a temperature of 0° C. with the exclusion of oxygen. The resulting condensation product has the formula

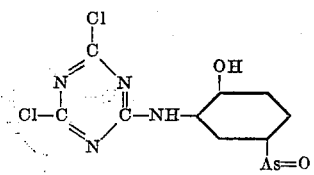

Subsequently, this reaction product may be treated with a base selected from the group consisting of ammonia, alkyl amines, hydroxyl-alkyl amines and dialkyl-amino-alkyl amines. Similar reactions may be obtained by using a dihalide such as 4-amino-phenylarsindichloride instead of 4-oxy-3-amino-phenylarsinoxide. Instead of the latter, its derivatives or isomers, such as, for instance, 2-oxy-4-amino-phenyl-arsinoxide, or 4-amino-3-oxy-phenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinyl-aminobenzene structure by treating the triazinyl-aminobenzene-arsonic acid condensation product in hydrochloric acid solution, in the presence of hydriodic acid, with $SO_2$, hypophosphorous acid ($H_2PO_3$), or stannous chloride, or in neutral or alkaline solution with phenyl-hydrazine or sodium hydrosulfite ($Na_2S_2O_4$). The reduction with $SO_2$ or phenylhydrazine leads to the arsinoxides, or dihalogenarsines, while the treatment with stannous chloride, hypophosphorous acid, and sodium hydrosulfite leads to the corresponding arseno-compounds.

For example, one part by weight of 2,4-diamino-1,3,5-triazinyl-(6)-[amino-3-oxy-4-phenylarsonic acid I] is dissolved at about 80° C. in 100 parts of hydrochloric acid of sp. gr. 1.19. To the clear, warm solution 1/50 part of sodium iodide is added, and a stream of $SO_2$ gas is allowed to pass through the solution. After a few minutes the solution becomes cloudy, and the hydrochloride of 2,4-diamino-1,3,5-triazinyl-(6)-oxy-amino phenylarsindichloride separates out in crystalline form. It is soluble in ethyl alcohol from which it may be recrystallized. It is slightly soluble in acetone, and insoluble in chloroform, $CCl_4$ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy-3-amino-phenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis-[2,2,'-4,4'-tetraamino-triazinyl-(6-6')]-3-3'-diamino-4-4'-dioxyarseno-benzene of the formula

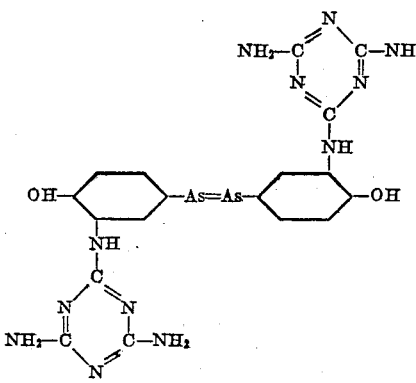

This compound is moderately soluble in dilute hydrochloric acid, and insoluble in ether and chloroform.

Other compounds according to my present invention may be obtained by applying the above described reduction processes to other arsono-anilino-triazine compounds, such as monochlor-monoamino-arsono-anilino-triazine, and other arsono-anilino-triazine compounds obtained according to my above mentioned U. S. Patent No. 2,295,574.

As described in Example 2 of my above mentioned U. S. Patent No. 2,295,574, p-[2,4-dichloro-1,3,5-triazinyl-(6)]-aminophenylarsonic acid may be treated with ammonia in order to convert it into a 2-chloro-4-amino-compound by covering said dichloro-compound with 10 times the quantity of 10% aqueous ammonia, and shaking at 45° C. for 1 hour, whereby the product goes into complete solution. By heating the [2-chloro-4-amino-1,3,5-triazinyl-(6)]-amino-phenyl-arsonic compound in hydrochloric acid solution with $SO_2$, a compound of the formula

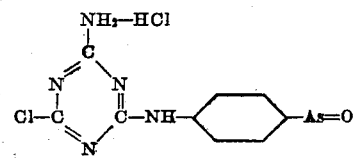

may be obtained.

A solution of 1/10 mol of 6-nitro-4-amino-3-methoxy-phenylarsonic acid in dilute aqueous sodium hydroxide is heated for 15 to 30 minutes with 1/10 mol of 2,4-diamino-6-chloro-1,3,5-triazine. The reaction mixture is now allowed to cool to room temperature and is precipitated with dilute hydrochloric acid in the cold. The reaction takes place according to the scheme:

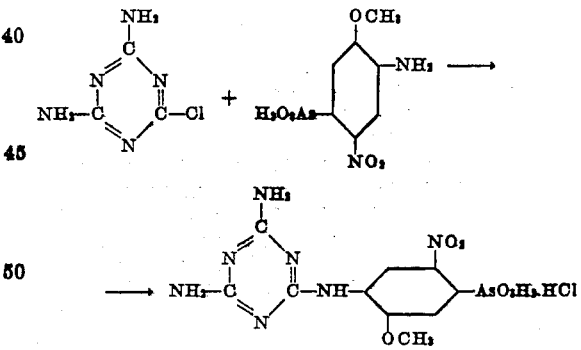

10 parts by weight of this precipitate are dissolved at 70°–80° C. in 1000 parts by weight of hydrochloric acid of sp. gr. 1.19, and the solution is subjected to the action of stannous chloride. The reduction product thus formed corresponds to the formula

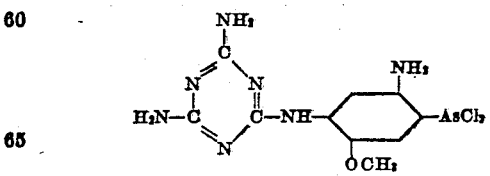

Similar products but containing in the triazine ring halogen substituents and/or amino or substituted amino radicals linked to the carbon atoms of the triazine ring, may be obtained by reacting the above mentioned 6-nitro-4-amino-3-methoxy-phenyl-arsonic acid with one halogen atom of cyanuric chloride, and subjecting the condensation product thus formed to reduction. Or one or both halogen atoms of the condensation product may be first reacted with a base selected from the group consisting of ammonia, alkyl amines, hydroxy-alkyl amines and dialkyl-amino-alkyl-amines and the resulting reaction product may then be subjected to reduction in the above described manner.

Furthermore, other similar compounds embodying the present invention may be obtained, for example, by subjecting cyanuric chloride or 2,4-diamino-6-chloro-1,3,5-triazine to condensation in the above described manner with aminophenyl-arsonic acid compounds substituted in the benzene ring by a nitro-group or by a nitro-group and a halogen, hydroxy-O-acyl, or alkyl group and subjecting said nitro-group and the arsonic acid group of the condensation product to reduction substantially in accordance with the above described procedure.

A compound of the formula

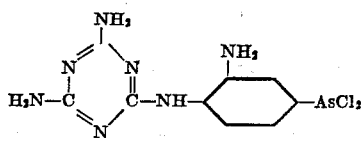

may be, for example, prepared by condensing 3-nitro-4-amino-phenylarsonic acid with 2,4-diamino-6-chloro-1,3,5-triazine, and subjecting the reaction product to reduction by means of stannous chloride in dilute hydrochloric acid solution.

Reference is made to my co-pending application Ser. No. 422,234, filed on December 9, 1941, of which this is a continuation in part.

It is to be understood that in the above specification and the appended claims the term "amino radical" or "amino radicals" is used to include "—NH₂" radicals as well as the above disclosed substituted amino radicals.

I claim:

1. A 1,3,5-triazine derivative of the formula

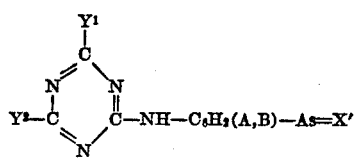

wherein one of $Y^1$ and $Y^2$ is an amino radical, while the other is selected from the group consisting of halogen radicals and amino radicals; $C_6$ represents a benzene ring, one of A and B is an amino radical, while the other is selected from the group consisting of hydrogen, halogen, —OH, —O-alkyl, —O-acyl, and alkyl radicals; X' is a divalent radical selected from the group consisting of O, S and dihalides.

2. A 1,3,5-triazine derivative of the formula

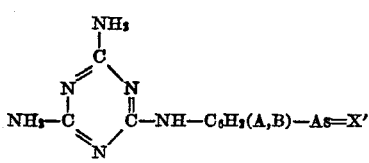

wherein $C_6$ represents a benzene ring, one of A and B is an amino radical, while the other is selected from the group consisting of hydrogen, halogen, —OH, —O-alkyl, —O-acyl, and alkyl radicals; X' is a divalent radical selected from the group consisting of O, S and dihalides.

3. A 1,3,5-triazine derivative of the formula

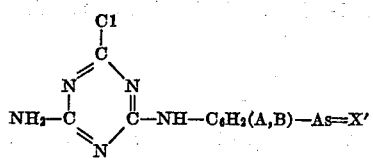

wherein $C_6$ represents a benzene ring, one of A and B is an amino radical, while the other is selected from the group consisting of hydrogen, halogen, —OH, —O-alkyl, —O-acyl, and alkyl radicals; X' is a divalent radical selected from the group consisting of O, S and dihalides.

4. A 1,3,5-triazine derivative of the formula

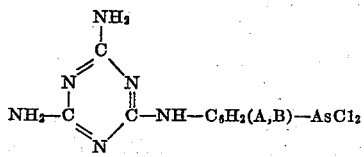

wherein $C_6$ represents a benzene ring, and one of A and B is an amino radical, while the other is selected from the group consisting of hydrogen, halogen, —OH, —O-alkyl, —O-acyl, and alkyl radicals.

5. A 1,3,5-triazine derivative of the formula

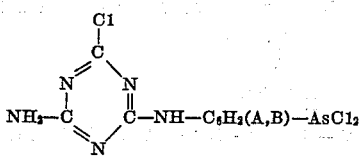

wherein $C_6$ represents a benzene ring, and one of A and B is an amino radical, while the other is selected from the group consisting of hydrogen, halogen, —OH, —O-alkyl, —O-acyl, and alkyl radicals.

6. A process for the preparation of a 1,3,5-triazine derivative as claimed in claim 1, said process comprising subjecting in aqueous solution a 1,3,5-triazine derivative of the formula

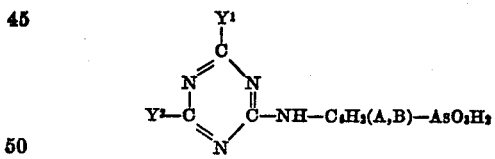

wherein one of $Y^1$ and $Y^2$ is an amino radical, while the other is selected from the group consisting of halogen radicals and amino radicals; $C_6$ represents a benzene ring; one of A and B is an amino radical, while the other is selected from the group consisting of hydrogen, halogen, —OH, —O-alkyl, —O-acyl and alkyl radicals, to the action of a reducing agent.

7. A process for the preparation of a 1,3,5-triazine compound of the formula

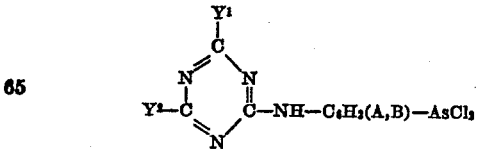

wherein one of $Y^1$ and $Y^2$ is an amino radical, while the other is selected from the group consisting of halogen radicals and amino radicals; $C_6$ represents a benzene ring; one of A and B is an amino radical, while the other is selected from the group consisting of hydrogen, halogen, —OH, —O-alkyl, —O-acyl and alkyl radicals, said process comprising subjecting in aqueous solution a 1,3,5-triazine derivative of the formula

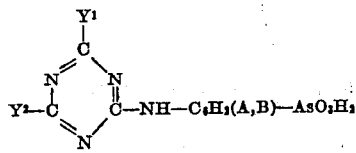

to the action of $SO_2$ in the presence of hydrochloric acid and hydriodic acid.

8. A process for the preparation of a 1,3,5-triazine compound of the formula

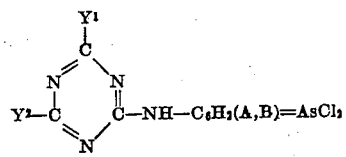

wherein one of $Y^1$ and $Y^2$ is an amino radical, while the other is selected from the group consisting of halogen radicals and amio radicals; $C_6$ represents a benzene ring; one of A and B is an amino radical, while the other is selected from the group consisting of hydrogen, halogen, —OH, —O-alkyl, —O-acyl and alkyl radicals, said process comprising subjecting in aqueous solution a 1,3,5-triazine derivative of the formula

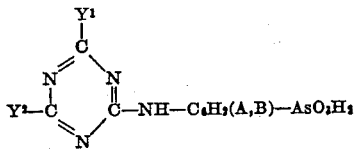

to the action of stannous chloride in aqueous hydrochloric acid solution.

9. A process for the preparation of a 1,3,5-triazine compound of the formula

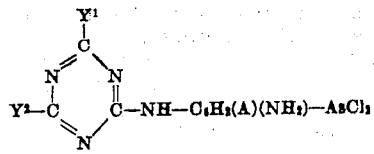

wherein one of $Y^1$ and $Y^2$ is an amino radical, while the other is selected from the group consisting of halogen radicals and amino radicals, and A is a radical selected from the group consisting of hydrogen, halogen, —OH, —O-alkyl, —O-acyl and alkyl radicals, said process comprising subjecting a compound of the formula

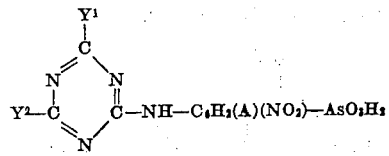

to the action of a reducing agent in aqueous hydrochloric acid solution.

ERNST A. H. FRIEDHEIM.